United States Patent Office 3,694,232
Patented Sept. 26, 1972

3,694,232
FLAVORING METHODS AND COMPOSITIONS CONTAINING 3-PHENYL PENTENALS
John B. Hall, Rumson, and Manfred Vock, West Orange, N.J., assignors to International Flavors & Fragrances, Inc., New York, N.Y.
No Drawing. Filed June 4, 1970, Ser. No. 43,555
Int. Cl. A23l 1/26
U.S. Cl. 99—140 R
21 Claims

ABSTRACT OF THE DISCLOSURE

Foodstuff flavor augmenting compositions containing a quantity of a 3-phenyl pentenal sufficient to alter the organoleptic characteristics of said compositions and process for preparing the said 3-phenyl pentenals.

---

The present invention relates in general to compositions useful in altering the organoleptic characteristics of a foodstuff. More particularly, this invention has to do with the use of 3-phenyl pentenals to alter the flavor of foodstuffs.

The term "alter" in its various forms is used herein to mean the supplying or imparting a flavor character or note to an otherwise bland, relatively tasteless substance, or augmenting the existing flavor characteristic where a natural flavor is deficient in some regard, or supplementing the existing flavor impression to modify its quality, character or taste.

The term "foodstuff" as used herein includes both solid and liquid ingestible materials which usually do, but need not, have nutritional value. Thus, foodstuffs include meats, gravies, soups, convenience foods, beverages, dairy products, candies, vegetables, cereals, soft drinks, snacks and the like.

Chocolate and cocoa-flavored foodstuffs are very popular, and a great deal of effort has been devoted to the preparation of materials which have a natural chocolate or cocoa flavor as well as to improve the chocolate and cocoa flavors of certain types of natural materials.

In the past, it was found that substitute chocolate and cocoa flavoring materials lacked certain sweet milk-chocolate like characteristics found in quality chocolate and cocoa, and the products made from such materials were deficient in flavor and/or aroma.

In accordance with this invention, it has been found that novel foodstuff and flavoring compositions having sweet milk-chocolate like characteristics found in quality chocolate may be provided by the utilization of at least one compound comprising a 3-phenyl pentenal. The terms "phenyl" and "pentenal" as used herein are intended to encompass both the substituted and unsubstituted derivatives. Thus, either of such moieties may contain one or more substituents, the salient requirement being that any such substituents be devoid of any tendency to deleteriously affect the functionality of the parent compound having reference to the ultimate environment contemplated, i.e., a foodstuff or flavoring composition. Thus, with respect to the phenyl moiety, suitable nuclear substituents include lower alkyl and/or lower alkoxy containing from 1 to 5 and preferably 1 to 3 carbon atoms. Moreover, such substituent groups may be present in amounts sufficient to provide either a partially or completely substituted phenyl ring. With respect to the carbon atoms comprising the pentenal chain, lower alkyl of 1 to 5 and preferably 1 to 3 carbon atoms are suitable.

Thus, the 3-phenyl pentenals contemplated for use in the practice of the present invention can also, for convenience, be represented according to the following structural formula:

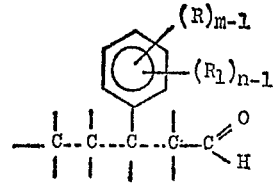

wherein R represents hydrogen or lower alkoxy containing from 1 to 5 carbon atoms, $R_1$ represents hydrogen or lower alkyl containing from 1 to 5 carbon atoms and $m$ and $n$ represent integers of 1 to 5 inclusive, their sum $(m+n)$ being from 2 to 7, and wherein one of the dashed lines represents a carbon to carbon double bond and the other two lines each represents a carbon to carbon single bond, the remaining valence of each carbon atom being satisfied by at least one member selected from hydrogen and lower alkyl of 1 to 5 carbon atoms. In the foregoing formula, the lower alkyl group defined by $R_1$ as well as the lower alkoxy group defined by R may be the same or different. Specific examples of compounds falling within the scope of the foregoing structural formula include, without necessary limitation, the following:

3-phenyl-3-pentenal
3-phenyl-2-pentenal
3-phenyl-4-pentenal
5-methyl-3-(4'-methylphenyl)-4-pentenal
3-(3',4',5'-trimethoxyphenyl)-3-pentenal
3-phenyl-4-methyl-2-pentenal
3-(2',3',4',5'-tetramethylphenyl)-2-pentenal
3,4-dimethyl-3-phenyl-4-pentenal
2,3,4-trimethyl-3-(2',3',4'-triethoxyphenyl)-4-pentenal
3-(3'-methyl-4'-methoxyphenyl)-2-pentenal
3-(3',4',5'-trimethylphenyl)-2-pentenal
3-(3',4',5'-triethylphenyl)-2-pentenal
3-(3',4',5'-trimethoxyphenyl-4-pentenal
3-(3'-ethyl-4',5'-dimethoxyphenyl)-3-pentenal
3-(2',5'-dimethyl-3',4'-diethoxyphenyl)-4-pentenal
3-(2',3',5'-tetramethylphenyl)-4-pentenal
3-(2',3'-diethoxy-4',5'-dimethoxyphenyl)-4-pentenal As will be apparent from the foregoing, the 3-phenyl, pentenal compounds may, in addition, be represented structurally as follows:

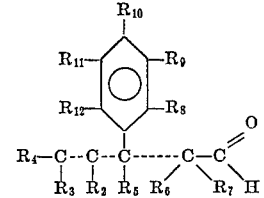

wherein $R_2$, $R_3$, $R_4$, $R_5$, $R_6$, and $R_7$ are hydrogen or the same or different lower alkyl; $R_8$, $R_9$, $R_{10}$, $R_{11}$, and $R_{12}$ are hydrogen or the same or different lower alkyl or the same or different lower alkoxy and wherein the dashed lines have the significance previously explained.

The pentenal derivatives described herein are capable of supplying certain flavor and aroma notes usually lacking in many of the chocolate and cocoa materials heretofore provided; thus, the latter materials characteristically yield a chocolate flavor which may be characterized as "thin" and "harsh." By way of contrast, the pentenal derivatives of the present invention provide an organoleptic impression similar to that which is achieved by the addition of milk and sugar to chocolate.

Particularly preferred for use herein are the pentenal compounds of the foregoing formula wherein each of the valences present in the carbon atoms of the pentenal chain, apart from that necessary to provide the single double bond, is satisfied by hydrogen and wherein, $m$ and $n$ is each one. Such compounds can be represented as follows:

3-phenyl-4-pentenal

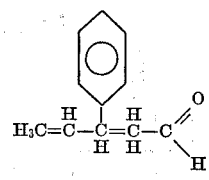

3-phenyl-3-pentenal

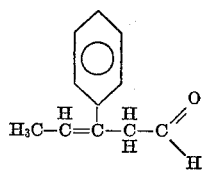

3-phenyl-2-pentenal

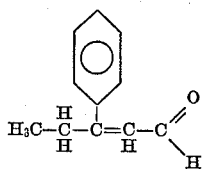

The 3-phenyl pentenals may be employed either singly or in admixture comprising two or more thereof. In this manner, the processor is afforded means whereby to exploit the beneficial nature of each a plurality of pentenal compounds in a specific instance.

In many instances the optimum balance of flavor is obtained by utilizing mixtures of compounds wherein at least one component comprises an unsubstituted 3-phenyl pentenal i.e., contains no substituents on either the pentenal chain or the phenyl moiety and the other component comprises at least one substituted 3-phenyl pentenal i.e., an alkyl and/or alkoxy-substituted phenyl group. Such mixtures may comprise, for example, 3-phenyl-4-pentenal; 3-(4′-methylphenyl)-4-pentenal and/or 3-(4′-methoxyphenyl)-4-pentenal. When mixtures of the 3-phenyl pentenals are used, their proportions can be varied as desired to suit the particular foodstuff to be flavored and will depend upon whether the composition so formulated is utilized to supply a total organoleptic impression or to enhance or fortify an existing flavor and/or aroma characteristic. It has been found when preparing chlocolate and cocoa flavors, for example, that a good blend is obtained by using a mixture of about 10–20% of at least one unsubstituted 3-phenyl pentenal, e.g., 3-phenyl-4-pentenal, 3-phenyl-3-pentenal and/or 3-phenyl-2-pentenal; about 40–50% of at least one 3-phenyl pentenal having alkyl and/or alkoxy substituents on the phenyl group e.g., 3-(2′,4′,6′-trimethoxyphenyl)-4-pentenal, 3-(2′,3′,4′-trimethylphenyl)-3-pentenal and/or 4-methyl-3-phenyl-2-pentenal; about 10–20% of at least one trialkyl substituted 3-phenyl pentenal e.g., 3-methyl-3-(2′,4′-dimethylphenyl)-4-pentenal, 4-methyl-3-(2′,4′-dimethylphenyl)-2-pentenal and/or 4-ethyl-3-(2′,4′-methylphenyl) - 2 - pentenal, and about 20–30% of at least one tetraalkyl 3-phenyl pentenal e.g., 3-methyl-3-(2′,4′-6′-trimethyl-phenyl)-4-pentenal. It will be understood that these ratios can be varied to supply, enhance, modify or fortify the flavor of the foodstuff or flavoring composition.

The 3-phenyl pentenals contemplated for use in the practice of this invention can be synthesized by reacting an appropriately substituted or unsubstituted 3-phenyl-propen-2-ol-1 and an appropriately substituted or unsubstituted alkyl vinyl ether. The reaction can take place using as a catalyst a protonic acid (such as phosphoric acid) forming, in one step, a mixture of 3-phenyl-4-pentenals, 3-phenyl-3-pentenals and 3-phenyl-2-pentenals. The desired end products can also be obtained using the aforementioned reactants but using a mercuric catalyst such as mercuric acetate (in place of the acid catalyst). In the event that such a mercuric catalyst is used in the place of the acid catalyst the reaction will first yield a phenyl alkenyl vinyl ether. This phenyl alkenyl vinyl ether is then re-arranged to form a phenyl pentenal by heat treatment. Thus, for example, cinnamyl vinyl ether is rearranged to form 3-phenyl-4-pentenal (boiling point 120–121° C. (25 mm. Hg pressure)) substantially according to the procedure of Burgstahler J. Chem. Soc., 1963, pages 4986–9 (see paragraph 2 on page 4989). The rearrangement of the vinyl ether is effected by heating the said ether at a temperature of from 180–250° C. and a pressure of from 1 to 10 atmospheres, followed by distillation for ultimate purification. Similarly, for example, the vinyl ether of alpha-methyl cinnamic alcohol can be rearranged by heating to form 4-methyl-3-phenyl-4-pentenal.

The one step reaction sequence where a protonic acid is used as the catalyst is as follows:

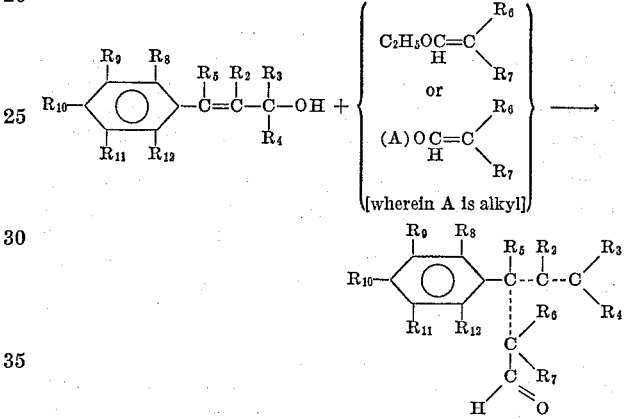

wherein $R_2$, $R_3$, $R_4$, $R_5$, $R_6$ and $R_7$ are hydrogen or lower alkyl; $R_8$, $R_9$, $R_{10}$, $R_{11}$ and $R_{12}$ are hydrogen, alkoxy or lower alkyl and one of the dashed lines is a double bond and each of the other two dashed lines is a single bond. It is most desirable that when each of $R_3$ and $R_4$ is lower alkyl, the reaction be carried out in the above manner. In place of phosphoric acid other protonic acids of similar acid strength such as oxalic acid and chloroacetic acid are also suitable. Where phosphoric acid is used, its concentration in the reaction mixture is preferably in the range of from 0.01% up to 0.5% by weight of the reaction mass.

The reaction sequence wherein a phenyl alkenyl vinyl ether is formed used a mercuric catalyst is as follows:

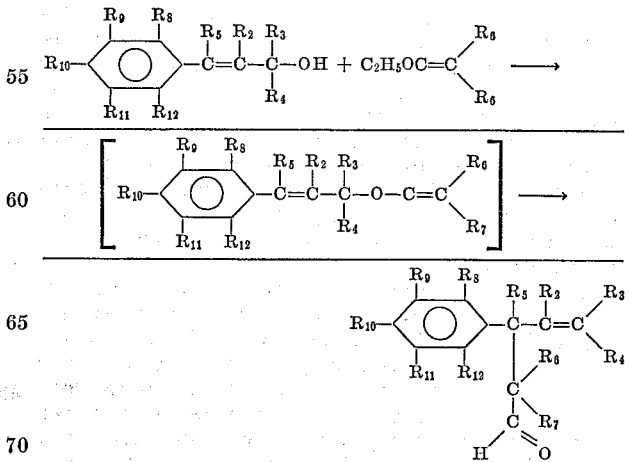

wherein $R_2$, $R_3$, $R_4$, $R_5$, $R_6$, $R_7$, $R_8$, $R_9$, $R_{10}$, $R_{11}$ and $R_{12}$ and the dashed lines as as defined heretofore. When $R_3$ and/or $R_4$ are hydrogen either of the foregoing reaction sequences may be utilized.

As additional examples, vinyl ethers of the following substituted and unsubstituted phenyl-1-alkenols can be utilized to yield the following 3-phenyl-4-pentenal products.

| 3-phenyl-alken-2-ol reactant | 3-phenyl-4-pentenal product |
| --- | --- |
| 1,1-dimethyl-3-phenyl-propen-2-ol-1. | 3-phenyl-5,5-dimethyl-4-pentenal. |
| 1,1-dimethyl-3(2',4',6'-trimethylphenyl)-propen-2-ol-1. | 5,5-dimethyl-3-(2',4',6'-trimethylphenyl)-4-pentenal. |
| 1-methyl-1-ethyl-2-propyl-3-phenyl-propen-2-ol-1. | 4-propyl-5-methyl-5-ethyl-3-phenyl-4-pentenal. |
| 1,1-dimethyl-2,3-diethyl-3-phenyl-propen-2-ol-1. | 3,4-diethyl-5,5-dimethyl-3-phenyl-4-pentenal. |
| 2,3-diethyl-3-(2',4'-dimethoxyphenyl)-propen-2-ol-1. | 3,4-diethyl-3-(2',4',-dimethoxyphenyl)-4-pentenal. |
| 2-ethyl-3-phenyl-propen-2-ol-1 | 4-ethyl-3-phenyl-4-pentenal. |
| 2-butyl-3-(3'-methoxyphenyl)-propen-2-ol-1. | 4-butyl-3-(3'-methoxyphenyl)-4-pentenal. |

The carbon-carbon double bond in the pentenal moiety of the 3-phenyl-4-pentenal end product may be rearranged to form a 3-phenyl-3-pentenal. On further appropriate treatment of the 3-phenyl-3-pentenal, a 3-phenyl-2-pentenal is formed. Initially, the aldehyde moiety may be stabilized by treatment of the 3-phenyl-4-pentenal with an alcohol such as ethanol in order to form an acetal. The resulting acetal of 3-phenyl-4-pentenal is then treated with either (a) catalytic quantities of palladium or iron carbonyl, or (b) alcoholic potassium or sodium hydroxide, whereby a 3-phenyl-3-pentenal diethyl acetal is formed. The resulting acetal is then hydrolyzed with acid to form the corresponding 3-phenyl-3-pentenal. If desired, the 3-phenyl-3-pentenal may be treated with alcoholic potassium or sodium hydroxide to form a 3-phenyl-2-pentenal. The aforementioned reaction sequence is illustrated as follows:

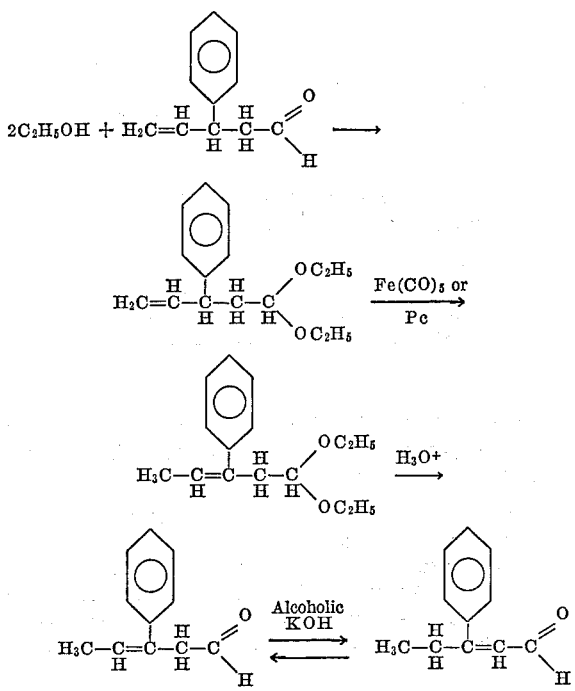

The nature of the co-ingredients included with the 3-phenyl pentenal in formulating the product composition will, of course, depend primarily upon the ultimate use contemplated, i.e., as a foodstuff per se or alternatively as a flavoring composition adapted to be added to a foodstuff at some subsequent point of time. In any event, such compounds serve to alter the organoleptic characteristics of the ultimate foodstuff treated therewith.

Substances suitable for use herein as co-ingredients or flavoring adjuvants are well known in the art for such use being extensively described in the relevant literature. Apart from the requirement that any such material be "ingestibly" acceptable, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditioners, flavorants and flavor intensifiers.

Stabilizer compounds include preservatives, e.g. sodium chloride, antioxidants, e.g., calcium and sodium ascorbate, ascorbic acid, butylated hydroxyanisole (mixture of 2 or 3 tertiary butyl-4-hydroxyanisole), butylated hydroxy toluene (2,6-di-tertiary-butyl-4-methyl phenol), propyl gallate and the like, sequestrants, e.g. citric acid.

Thickener compounds include carriers, binders, protective colloids, suspending agents, emulsifiers and the like, e.g., agar-agar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches, pectins, and emulsifiers, e.g., mono- and diglycerides of fatty acids, skim milk powder, hexoses, pentoses, disaccharides, e.g. sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, tumeric and curcunin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphates, ferrous gluconate and the like, riboflavin, vitamins, zinc sources such as zinc chloride, zinc sulfate and the like.

Flavorants and flavor intensifiers include organic acids, e.g., fatty saturated, unsaturated and amino acids; alcohols, e.g. primary and secondary alcohols; esters; carbonyl compounds including aldehydes and ketones, lactones; cyclic organic materials including benzene derivatives; alicyclics, pyridines, pyrazines and the like, sulfur-containing materials including thiazoles, thiols, sulfides, disulfides and the like; so-called flavor protentiators such as monosodium glutamate, guanylates, inosinates, natural and synthetic flavorants such as vanillin, ethyl vanillin, diacetyl, phenethyl, 2-furoate, maltol, natural gums and the like; spices, herbs, essential oils and extractives including "bitterness principles" such as theobromin, caffein, naringin and other suitable materials creating a bitter effect.

The specific flavoring adjuvant selected for use may be either solid or liquid, depending upon the desired physical form of the ultimate product, i.e., foodstuff, whether simulated or natural, and should, in any event, be capable of providing an environment in which the 3-phenyl pentenal can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted, In contra-distinction, in the preparation of solid products, e.g., simulated foodstuffs, ingredients capable of providing normally solid compositions should be selected such as various cellulose derivatives.

As will be appreciated by those skilled in the art, the amount of 3-phenyl pentenal employed in a particular instance can vary over a relatively wide range whereby to achieve desired organoleptic effects having reference to the nature of the product. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected be effective, i.e. sufficient to alter the organoleptic characteristics of the parent composition, whether foodstuffs per se or flavoring composition. Thus, the use of insufficient quantities of the 3-phenyl pentenal will, of course, substantially vitiate any possibility of obtaining the desired results while excess quantities prove needlessly costly and in extreme cases, may disrupt the flavor-aroma balance, thus providing self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of 3-phenyl pentenal ranging from a small but effective amount, e.g., 1.0 part per million up to about 200 parts per million by weight based on total composition are suitable. Concentrations in excess of the maximum quantities stated are not normally recommended since they fail to provide commensurate enhancement of organoleptic properties. In those instances wherein the 3-phenyl pentenal is added to the foodstuff as an integral component of a flavoring composition, it is, of course, essential that the total quantity of flavoring composition employed be sufficient to yield an effective 3-phenyl pentenal concentration in the foodstuff product.

Flavoring compositions prepared in accordance with the present invention preferably contain the 3-phenyl pentenal in concentrations ranging from about 20% to 100% by weight, based on the total weight of said flavoring composition.

The compositions described herein can be prepared according to conventional techniques well known in the art for such purposes. Thus, liquid products as typified by cake batters and chocolate milk can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 3-phenyl pentenal with, for example, gum arabic, gum tragacanth, carrageenan and the like, and thereafter, spray-drying the resultant mixture whereby to obtain the particulate solid product. Pre-prepared flavor mixes in powder form e.g., cocoa mix may be obtained by mixing the dried solid components e.g., milk solids, sugar and the like and 3-phenyl pentenal in a dry blender until the requisite degree of uniformity is achieved.

It is presently preferred to combine with the 3-phenyl pentenal the following flavoring adjuvants: vanillin, maltol, benzaldehyde and isovaleraldehyde.

The following examples are given for purposes of illustration only and are not to be considered as necessarily constituting a limitation on the present invention.

EXAMPLE I

A commercial cocoa mix is used to prepare two different batches of beverage. The first batch is evaluated without any further additive, while 3-phenyl-4-pentenal is added to the second batch in the ratio of 40 mg. of the 3-phenyl-4-pentenal to each kilogram of cocoa beverage. The beverage without 3-phenyl-4-pentenal gives a rather harsh flavor impression, while the beverage containing 3-phenyl-4-pentenal according to the present invention has a fuller, richer sweet milk chocolate flavor.

EXAMPLE II

Example I is repeated except that the 3-phenyl-4-pentenal is replaced with the same amount of 3-phenyl-3-pentenal. The results are similar to those described in Example I.

EXAMPLE III

Example I is repeated except that the 3-phenyl-4-pentenal is replaced with the same amount of 3-phenyl-2-pentenal. The results are similar to those described in Example I.

EXAMPLE IV

A basic cocoa flavor material is prepared by admixing the following ingredients:

| Compound: | Amount (grams) |
|---|---|
| Maltol | 3.0 |
| Acetaldehyde (50% in ethanol) | 20.0 |
| Isobutyraldehyde | 16.0 |
| Isovaleraldehyde | 42.5 |
| Benzyl alcohol | 10.0 |
| Methyl sulfide | 0.4 |
| Methyl disulfide | 0.4 |
| Isobutyl acetate | 0.1 |
| Isoamyl acetate | 0.2 |
| Phenylethyl acetate | 0.6 |
| Diacetyl (10% in ethanol) | 0.2 |
| Acetophenone | 1.0 |
| Furfural (50% in ethanol) | 0.1 |
| Benzaldehyde | 1.0 |
| Isoamyl alcohol | 0.2 |
| Phenylethyl alcohol | 3.5 |
| γ-Butyrolactone | 0.2 |
| | 100.0 |

A nut-like flavor note material is prepared by combining the following ingredients as shown:

| Compound: | Amount (grams) |
|---|---|
| 2-methyl pyrazine | 20 |
| 2,6-dimethyl pyrazine | 10 |
| 2,3,5,6-tetramethyl pyrazine | 10 |
| | 40 |

A sweet milk chocolate flavor note material according to this invention is prepared by combining the following ingredients as shown:

| Compound: | Amount (grams) |
|---|---|
| 3-phenyl-3-pentenal | 20 |
| 3-(2'-methylphenyl)-4-pentenal | 34 |
| 3-phenyl-4-methyl-4-pentenal | 42 |
| 3 - (2',3',4'-trimethoxyphenyl)-4-methyl-4-pentenal | 4 |
| | 100 |

A first flavor composition (A) is prepared by adding to a 1.9% solution of the basic cocoa flavor in propylene glycol/ethyl alcohol (v./v. 80/20), vanillin in the ratio of 10 grams per kilogram of solution. A second flavor composition (B) is provided by preparing a 1% solution of the basic cocoa flavor combined with the nut-like flavor note material and sweet milk chocolate flavor note material (weight ratio; 80:20:1 respectively) in propylene glycol/ethyl alcohol (v./v. 80/20). Vanillin is added in the ratio of 10 grams per kilogram of liquid.

Flavor composition (A) is found to lack the desired sweet milk chocolate flavor note; by way of contrast, flavor composition (B) is found to have an excellent sweet, dark, cocoa flavor and aroma note. The addition of flavor composition (B) to flavor composition (A) in amounts yielding a weight ratio of (B) to (A) of 1:10 provides a flavor composition having an excellent sweet, dark, occoa flavor and aroma note. A third flavor composition (C) is prepared by combining 10 parts of the nut-like flavor (10% solution) with 10 parts of vanilla and 1000 parts of a 1% solution of the basic cocoa flavor in ethyl alcohol.

A fourth flavor composition (D) is prepared by combining 20 parts of the sweet milk chocolate flavor note material with 10 parts of the nut-like flavor note material, 10 parts of vanilla and 1000 parts of a 1% solution of the basic cocoa flavor in ethyl alcohol. 1000 parts of a 1% solution of composition (A) in ethanol are then combined with 20 parts of a 10% solution of composition (D) in ethanol, 10 parts of a 10% solution of composition (C) in ethanol and 10 parts of vanilla.

The combined flavor, thus prepared is again found to have an excellent sweet, dark, cocoa flavor and aroma note, whereas the flavor without composition (D) and thus devoid of the 3-phenyl pentenal of this invention lacks the desirable sweet milk chocolate flavor note.

EXAMPLE V

The 3-phenyl pentenal and pyrazine-containing flavor note materials of Example II are added to a commercially available chocolate flavored dessert containing skim milk, sugar, non-fat dry milk solids, and cocoa with a bland, thin cocoa flavor. The addition of 45 mg./kg. of a 50:50 (w./w.) mixture of each of the two mixtures increases the sweet milk chocolate and nut-like notes to a desirable level and improves the overall flavor.

EXAMPLE VI

Example IV is repeated except that the 3-phenyl pentenal mixture described therein is replaced by the following mixture:

| Compound: | Amount (grams) |
|---|---|
| 3-phenyl-2-pentenal | 20 |
| 3-phenyl-3-pentenal | 32 |
| 3-(4'-ethylphenyl)-4-methyl-2-pentenal | 44 |
| 3-(3'-ethylphenyl)-4-methyl-3-pentenal | 4 |
| | 100 |

EXAMPLE VII

A flavor composition according to this invention is prepared by combining the following materials as shown:

| Compound: | Amount (grams) |
|---|---|
| 2-methyl pyrazine | 6.0 |
| 2,6-dimethyl pyrazine | 15.0 |
| 2,3,5,6-tetramethyl pyrazine | 12.0 |
| 3-phenyl-4-pentenal | 1.0 |
| Mixture of 4-methyl-3-phenyl-4-pentenal, 3-phenyl-3-pentenal, and 3-phenyl-3-pentenal (w./w. ratio=40:40:30) | 4.0 |
| | 38.0 |

This composition is added to a chocolate milk having a bland, thin cocoa flavor. Adding 30 mg./kg. increases the sweet milk chocolate and nut-like notes and supplemental addition of 40 mg./kg. of the basic cocoa flavor material as described in Example II gives the chocolate milk an excellent cocoa flavor and aroma note.

EXAMPLE VIII

Preparation of 3-phenyl-pentenals

Over a period of 2.5 hours at a temperature of 185° C. the following mixture is heated and stirred in an autoclave:

| | G. |
|---|---|
| Cinnamyl alcohol | 1000 |
| Ethyl vinyl ether | 1100 |
| Phosphoric acid H$_3$PO$_4$ (85%) | 3.3 |

At the end of the reaction, the reaction mass is cooled to 25° C. and 8 grams of sodium acetate is added. The unreacted ethyl vinyl ether is recovered by distillation at atmospheric pressure and the residue is then rushed over at 3 mm. Hg until the pot temperature reaches 180° C. (boiling range: 102–140° C./3 mm. Hg pressure). The distillate is stirred with twice its weight of aqueous 10% sulfuric acid at room temperature for a period of 5 hours and the resulting two phase mass is separated with the aid of toluene. The resulting oil layer is washed with dilute aqueous sodium bicarbonate and the solvent is then stripped off. The oil phase is then borated (with boric acid) to remove the excess unreacted cinnamyl alcohol present and the alcohol-free oil is then fractionated at 3 mm. Hg pressure (boiling point 86–91° C.) GLC indicates a mixture of isomers as follows:

3-phenyl-4-pentenal
3-phenyl-3-pentenal
3-phenyl-2-pentenal

Oximation indicates the presence of over 95% aldehyde (molecular weight 160).

We claim:

1. A flavor modifying composition comprising an ingestibly acceptable flavor adjuvant and at least one-3-phenyl pentenal in amounts sufficient to alter the flavor of a foodstuff in which it is incorporated, said 3-phenyl pentenal having the formula:

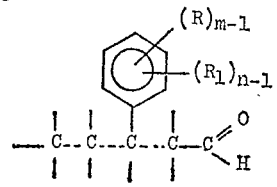

wherein R represents lower alkoxy containing from 1 to 5 carbon atoms, R$_1$ represents lower alkyl containing from 1 to 5 carbon atoms and $m$ and $n$ represent integers of from 1 to 6 inclusive, their sum being from 2 to 7, and wherein one of the dashed lines represents a carbon to carbon double bond and the other two dashed lines each represents a carbon to carbon single bond, the remaining valence of each carbon atom being satisfied by at least one member selected from hydrogen and lower alkyl of 1 to 5 carbon atoms.

2. A composition according to claim 1, wherein said flavoring adjuvant comprises a thickener, stabilizer, surface active agent, conditioner, flavoring intensifier or flavorant.

3. A composition according to claim 1, wherein said flavoring adjuvant comprises at least one mono- or polyalkyl substituted pyrazine.

4. A composition according to claim 3, wherein said pyrazine comprises at least one member selected from the group consisting of 2-methyl pyrazine, 2-ethyl pyrazine, 2,6-dimethyl pyrazine, 2,3,5,6-tetramethyl pyrazine; 2,6-diethyl pyrazine, 2,3,5,6-tetraethyl pyrazine, 2-ethyl-3,5-dimethyl pyrazine, and 2-ethyl-3,6-dimethyl pyrazine.

5. A composition according to claim 1, wherein said adjuvant is selected from the group consisting of alcohols, acids, esters, ketones, aldehydes, and chocolate principles.

6. A composition according to claim 2, wherein said pentenal is present in amount ranging from about 20% to 100% by weight of total composition.

7. A composition according to claim 1, wherein said flavoring adjuvant is selected from the group consisting of vanillin, maltol, isovaleraldehyde, benzaldehyde and mixtures thereof.

8. A composition according to claim 7 wherein said pentenal is present in amounts ranging from about 1 to 200 parts per million parts by weight of total composition.

9. A composition according to claim 1, wherein said pentenal comprises 3-phenyl-4-pentenal.

10. A composition according to claim 1 wherein said pentenal comprises 3-phenyl-3-pentenal.

11. A composition according to claim 1, wherein said pentenal comprises 3-phenyl-2-pentenal.

12. A composition according to claim 1, wherein said pentenal comprises a mixture of 3-phenyl-2-pentenal, 3-(2'-methylphenyl)-4-pentenal, 3-phenyl-4-methyl-4 - pentenal and 3-(2',3',4'-trimethoxyphenyl)-4-methyl-4 - pentenal.

13. A composition according to claim 1, wherein said pentenal comprises a mixture of 3-phenyl-2-pentenal, 3-phenyl-3-pentenal, 3-(4'-ethylphenyl)-4-methyl-3-pentenal and 3-(3'-ethylphenyl)-4-methyl-3-pentenal.

14. A composition according to claim 1, wherein said pentenal comprises a mixture of 3-phenyl-4-pentenal, 4-methyl-3-phenyl-4-pentenal, 3-phenyl-3-pentenal and 3-phenyl-2-pentenal.

15. A process for altering the flavor of a foodstuff which comprises incorporating in a foodstuff a small but effective amount of at least one 3-phenyl pentenal wherein said 3-phenyl pentenal has the formula:

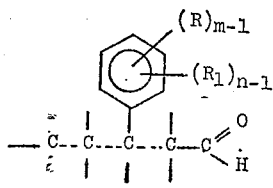

wherein R represents lower alkoxy containing from 1 to 5 carbon atoms, $R_1$ represents lower alkyl containing from 1 to 5 carbon atoms and $m$ and $n$ represent integers of from 1 to 6 inclusive, their sum being from 2 to 7, and wherein one of the dashed lines represents a carbon to carbon double bond and the other two dashed lines each represents a carbon to carbon single bond, the remaining valence of each carbon atom being satisfied by at least one member selected from hydrogen and lower alkyl of 1 to 5 carbon atoms.

16. A process according to claim 15, wherein said pentenal comprises 3-phenyl-4-pentenal.

17. A process according to claim 15, wherein said pentenal comprises 3-phenyl-3-pentenal.

18. A process according to claim 15, wherein said pentenal comprises 3-phenyl-2-pentenal.

19. A process according to claim 15, wherein said pentenal comprises a mixture of 3-phenyl-3-pentenal, 3-(2-methylphenyl)-4-pentenal, 3-phenyl-4-methyl-4 - pentenal and 3-(2',3'-4'-trimethoxyphenyl)-4-methyl-4 - pentenal.

20. A process according to claim 15, wherein said pentenal comprises a mixture of 3-phenyl-4-pentenal, 3-phenyl-2-pentenal, 3-phenyl-3-pentenal, 3 - (4' - ethylphenyl)-4-methyl-2-pentenal and 3-(3'-ethylphenyl) - 4-methyl-3-pentenal.

21. A process according to claim 15, wherein said pentenal comprises a mixture of 3-phenyl-4-pentenal, 4-methyl-3-phenyl-4-pentenal, 3-phenyl-3-pentenal and 3-phenyl-2-pentenal.

References Cited

UNITED STATES PATENTS

| | | | |
|---|---|---|---|
| 3,582,360 | 6/1971 | Van Praag et al. | 99—140 R |
| 3,459,556 | 8/1969 | Moroe et al. | 99—23 |

MORRIS O. WOLK, Primary Examiner

W. BOVEE, Assistant Examiner

UNITED STATES PATENT OFFICE
CERTIFICATE OF CORRECTION

Patent No. 3,694,232    Dated September 26, 1972

Inventor(s) JOHN B. HALL and MANFRED VOCK

It is certified that error appears in the above-identified patent and that said Letters Patent are hereby corrected as shown below:

Col. 3, lines 5-10 - The formula should read:

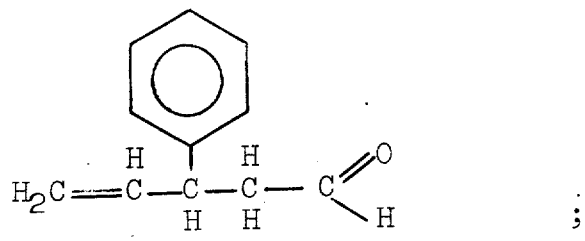

Col. 3, line 32 - Insert --of-- after "each";
Col. 3, line 49 - "chlocolate" should read --chocolate--;
Col. 4, line 51 - Replace "used" with --using--;

Col. 4, line 55 - The right-hand formula should read as follows:

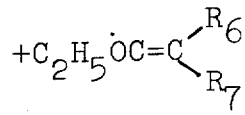

UNITED STATES PATENT OFFICE
CERTIFICATE OF CORRECTION

Patent No. 3,694,232      Dated September 26, 1972

Inventor(s) JOHN B. HALL and MANFRED VOCK

It is certified that error appears in the above-identified patent and that said Letters Patent are hereby corrected as shown below:

Col. 4, line 73 - Replace "as" first occurrence with --are--;

Col. 5, lines 45-50 - In the formula - "Pc" should be --Pd--;

Col. 9, line 8 - "occoa" should read --cocoa--;

Col. 6, line 46 - Change "phosphates" to --phosphate--;

Col. 6, line 54 - After "alicyclics," insert --heterocyclics such as furans, particularly 3-acetylfuran,--;

Col. 6, line 56 - Change "protentiators" to --potentiators--;

UNITED STATES PATENT OFFICE
CERTIFICATE OF CORRECTION

Patent No. 3,694,232        Dated September 26, 1972

Inventor(s) JOHN B. HALL and MANFRED VOCK

It is certified that error appears in the above-identified patent and that said Letters Patent are hereby corrected as shown below:

Col. 9, Example VII -Line 9 should read:

--phenyl-3-pentenal, and 3-phenyl-2-pentenal--;

Col. 10, Claim 1, line 2- Delete the "hyphen" after "one"

Col. 12, line 4 - "otheh" should read --other--.

Signed and sealed this 19th day of March 1974.

(SEAL)
Attest:

EDWARD M. FLETCHER, JR.
Attesting Officer

C. MARSHALL DANN
Commissioner of Patents